United States Patent
Takano et al.

(10) Patent No.: US 10,826,262 B2
(45) Date of Patent: Nov. 3, 2020

(54) ELECTRONIC EQUIPMENT ASSEMBLY APPARATUS AND ELECTRONIC EQUIPMENT ASSEMBLY METHOD

(71) Applicant: Panasonic Intellectual Property Management Co., Ltd., Osaka (JP)

(72) Inventors: Ken Takano, Osaka (JP); Yuji Takahashi, Yamagata (JP); Kazu Wagatsuma, Yamagata (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 373 days.

(21) Appl. No.: 15/785,664

(22) Filed: Oct. 17, 2017

(65) Prior Publication Data
US 2018/0123307 A1    May 3, 2018

(30) Foreign Application Priority Data
Nov. 2, 2016  (JP) .................................. 2016-214897

(51) Int. Cl.
*H01R 43/00* (2006.01)
*H01R 43/26* (2006.01)
(Continued)

(52) U.S. Cl.
CPC ............ *H01R 43/26* (2013.01); *B25J 9/1623* (2013.01); *B25J 9/1687* (2013.01); *H01R 12/716* (2013.01); *Y10T 29/49174* (2015.01)

(58) Field of Classification Search
CPC ...... H01R 43/26; H01R 12/716; B25J 9/1687; B25J 9/1623; G05B 2219/40267;
(Continued)

(56) References Cited

U.S. PATENT DOCUMENTS 5,212,576 A  *  5/1993  Yoshioka .......... H01L 23/49811
                                              257/E23.063
6,099,217 A  *  8/2000  Wiegand ............. B23Q 1/5462
                                              408/234
(Continued)

FOREIGN PATENT DOCUMENTS

CN     102855990 A     1/2013
JP     61-173881 A     8/1986
(Continued)

OTHER PUBLICATIONS

English Translation of Chinese Search Report dated Aug. 17, 2020 for the related Chinese Patent Application No. 201711011626.2.

*Primary Examiner* — Donghai D Nguyen
(74) *Attorney, Agent, or Firm* — Pearne & Gordon LLP

(57) ABSTRACT

An electronic equipment assembly apparatus installs a mounted portion of a cable onto a connector of electronic equipment, the cable including a belt-shaped cable main body portion in which the mounted portion is formed in one end portion, and a reinforcing plate bonded to the one end portion side on one surface of the cable main body portion. The electronic equipment assembly apparatus includes: a cable holding tool which nips and holds the reinforcing plate by a blade and a chuck block; and a robot portion which moves the cable holding tool.

12 Claims, 17 Drawing Sheets

(51) Int. Cl.
*B25J 9/16* (2006.01)
*H01R 12/71* (2011.01)

(58) Field of Classification Search
CPC .............. B23P 19/00; Y10T 29/4913; Y10T 29/53174; Y10T 29/53209; Y10T 29/49174
USPC .......................................... 29/832, 739, 747
See application file for complete search history.

(56) References Cited

U.S. PATENT DOCUMENTS

2004/0266276 A1  12/2004  Hariki et al.
2010/0256818 A1  10/2010  Aoba et al.

FOREIGN PATENT DOCUMENTS

| JP | 2000-340914 A | 12/2000 |
| JP | 2005-011580 A | 1/2005 |
| JP | 2008-053502 A | 3/2008 |
| JP | 2009-050921 A | 3/2009 |
| JP | 2009-107043 A | 5/2009 |
| JP | 2014-220212 A | 11/2014 |

\* cited by examiner

ELECTRONIC EQUIPMENT ASSEMBLY APPARATUS AND ELECTRONIC EQUIPMENT ASSEMBLY METHOD

BACKGROUND

1. Technical Field

The present disclosure relates to an electronic equipment assembly apparatus which performs assembly work for installing a mounted portion of a cable onto a connector, and an electronic equipment assembly method.

2. Description of the Related Art

In electronic equipment, such as an on-vehicle electronic apparatus, a flexible cable (hereinafter, simply referred to as "cable"), such as an FPC, which connects functional modules, such as a display device or a circuit board which configures the equipment to each other, is frequently used. In addition, in an assembly process of assembling the electronic equipment, connection work for installing a mounted portion of a cable onto a connector of a connection target is performed. The connection work is performed by manual work before, but it is difficult to improve work efficiency since the connection work, which regards the cable as a target, is complicated work accompanied by fine positioning, and automation of the type of work is suggested (for example, Japanese Patent Unexamined Publication No. 2005-11580 and Japanese Patent Unexamined Publication No. 2009-50921).

In the technology of the related art illustrated in Japanese Patent Unexamined Publication No. 2005-11580, the work for connecting the connector provided in a cable with a connector to a counterpart connector provided in a member, such as a board, is performed by two robots, such as a first robot and a second robot. In addition, in the technology of the related art illustrated in Japanese Patent Unexamined Publication No. 2009-50921, a workpiece (flexible cable) is held by a parallel link type robot, and is assembled to the workpiece (connector) positioned at a predetermined position in a predetermined posture by another parallel link type robot.

SUMMARY

According to an aspect of the disclosure, there is provided an electronic equipment assembly apparatus which installs a mounted portion of a cable onto a connector of electronic equipment, the cable including a belt-shaped cable main body portion in which the mounted portion is formed in one end portion, and a reinforcing plate bonded to the one end portion side on a one surface of the cable main body portion, the apparatus including: a cable holding tool which holds the reinforcing plate; a work stage which holds the electronic equipment; a robot portion which relatively moves the cable holding tool to the electronic equipment held by the work stage; and a controller which operates the robot portion and the cable holding tool to mount the mounted portion of the cable main body portion onto the connector.

According to another aspect of the disclosure, there is provided an electronic equipment assembly method for installing a mounted portion of a cable including a belt-shaped cable main body portion in which the mounted portion is formed in one end portion, and a reinforcing plate bonded to the one end portion side on a one surface of the cable main body portion, onto a connector of electronic equipment, the method including: holding the reinforcing plate by a cable holding tool; and mounting the mounted portion of the cable main body portion onto the connector of the electronic equipment by moving the cable holding tool.

According to the disclosure, it is possible to automate the work for installing the cable with a reinforcing plate onto the connector, and to improve the work efficiency.

DETAILED DESCRIPTION

Prior to the description of the exemplary embodiment, problems of the related art will be briefly described.

Since this type of cable has characteristics that the thickness is thin, rigidity is small, and bending is easy in many cases, a cable provided with a reinforcing plate for handling in the vicinity of a mounted portion which is a gripping target part, is used in connection work. In addition, in connection work by manual work, an operator grips the reinforcing plate and installs the mounted portion onto a connector which is a connection target, but the manual work has low work efficiency, and thus, it is strongly required to improve the work efficiency by automation. However, in the technology of the related art including the above-described related art, regarding the automation of the connection work in which an FPC including the reinforcing plate is regarded as a target, there is not specific disclosure of efficient technology regarding equipment configuration and the connection method, new technology is required.

Here, an object of the disclosure is to provide an electronic equipment assembly apparatus and an electronic equipment assembly method which can automate the connection work for installing the cable with a reinforcing plate onto the connector and can improve the work efficiency.

Next, an exemplary embodiment of the disclosure will be described with reference to the drawings. First, with reference to FIG. 1, the entire configuration of electronic equipment assembly apparatus 1 will be described. Electronic equipment assembly apparatus 1 connects functional modules, such as a circuit board or a display device, to each other by a cable, such as a flexible printed board, regarding electronic equipment 4 (refer to FIGS. 3 and 4), such as an on-vehicle electronic equipment as a work target. In other words, electronic equipment assembly apparatus 1 has a function of mounting a mounted portion of the cable connected to the display device or the like in advance onto the connector of the circuit board.

Figure 1:
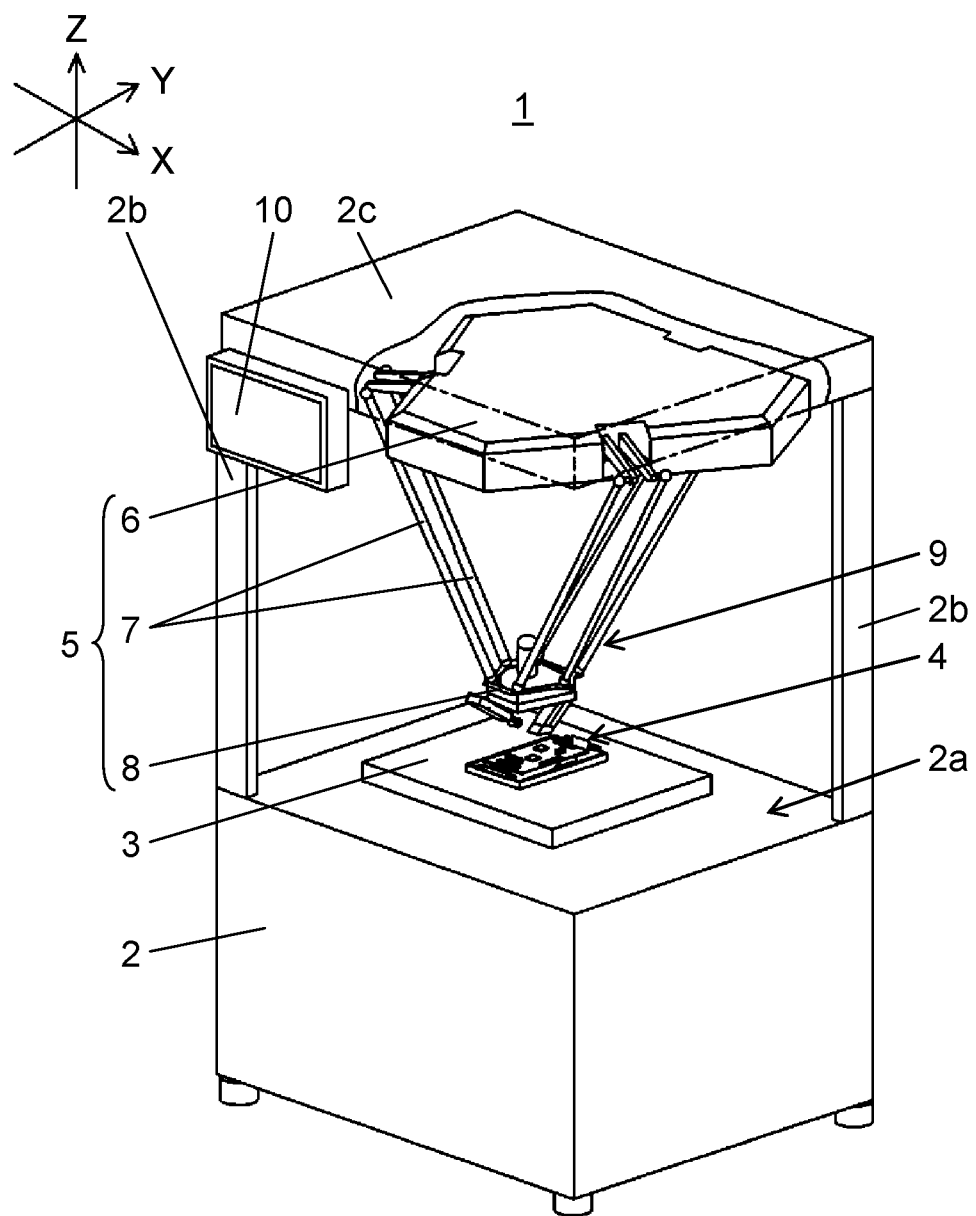
FIG. 1 is a perspective view of an electronic equipment assembly apparatus of one exemplary embodiment of the disclosure.

In FIG. 1, work stage 3 is provided on upper surface 2a of base 2, and work stage 3 positions and holds electronic equipment 4 which is the work target. Here, with reference to FIGS. 3 and 4, electronic equipment 4 which is the work target will be described. In addition, FIG. 3 illustrates a state before the cable is installed onto the connector, and FIG. 4 illustrates a state where the cable is installed onto the connector.

Figure 3:
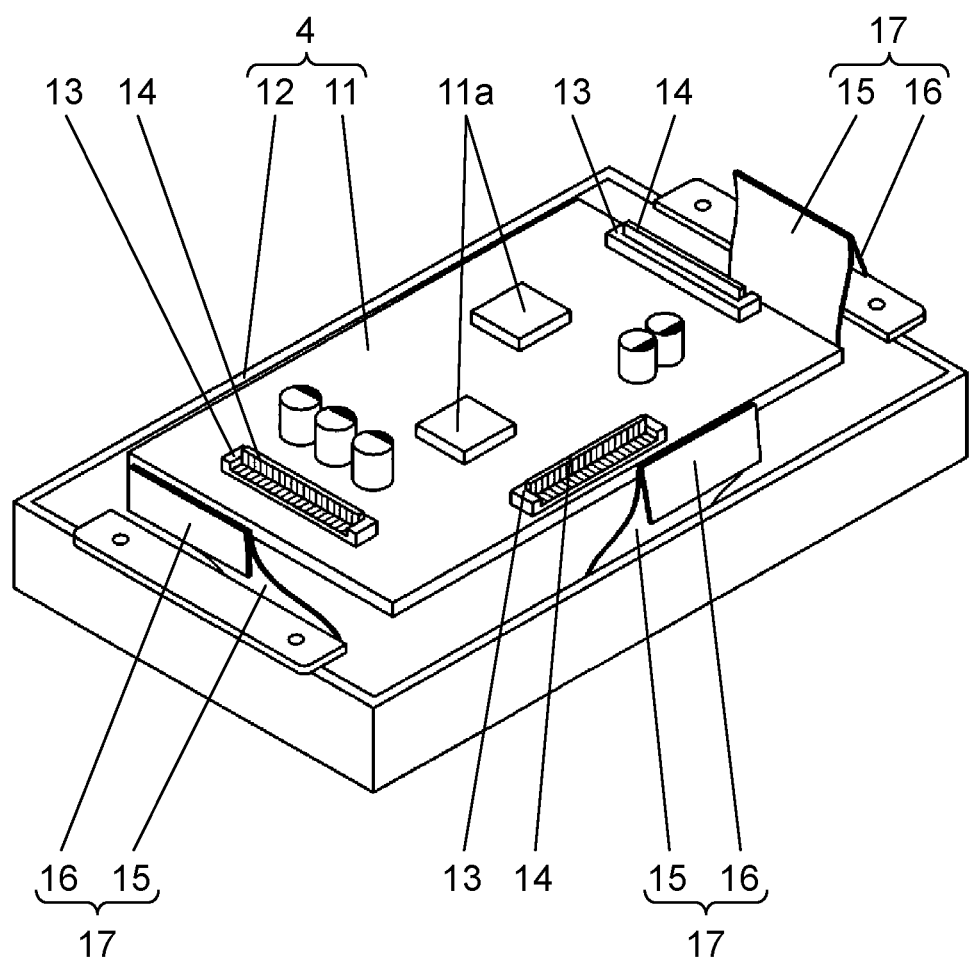
FIG. 3 is a perspective view of electronic equipment (before mounting a cable) which is a work target of the electronic equipment assembly apparatus of one exemplary embodiment of the disclosure.
Figure 4:
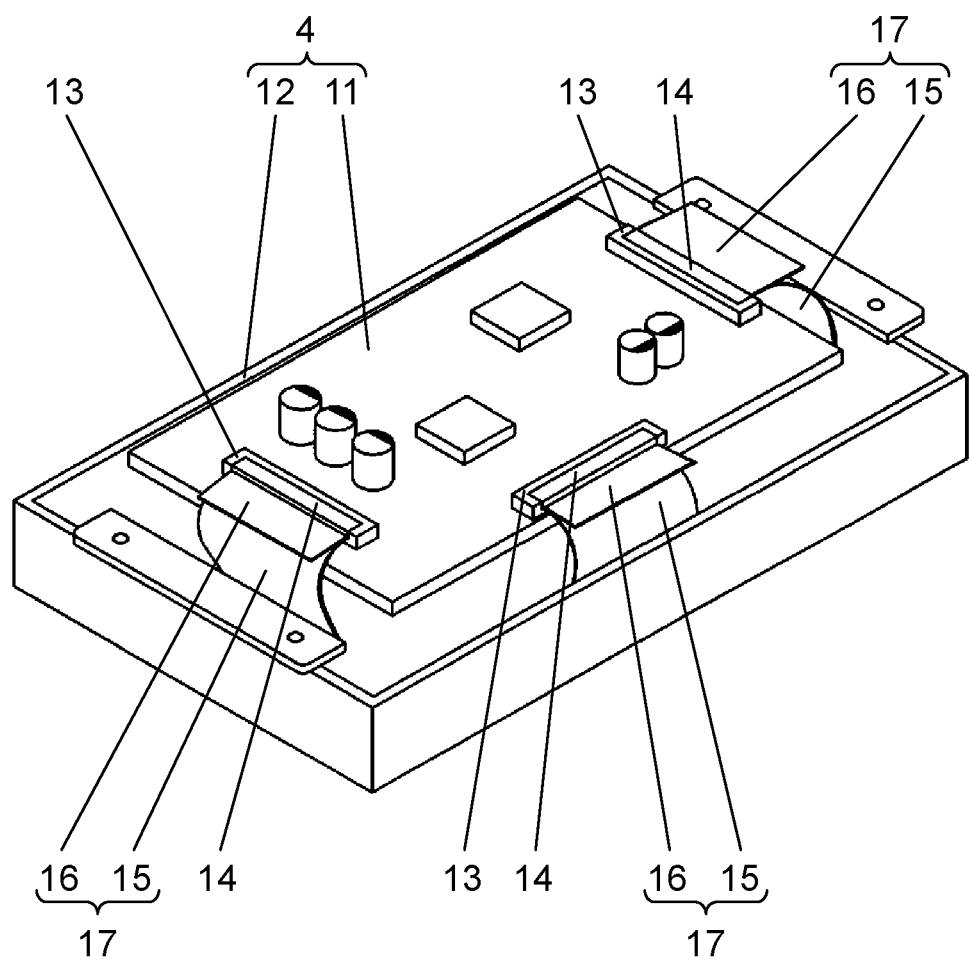
FIG. 4 is a perspective view of the electronic equipment (before mounting the cable) which is the work target of the electronic equipment assembly apparatus of one exemplary embodiment of the disclosure.

In FIG. 3, electronic equipment 4 is on-vehicle electronic equipment including a display device, such as a meter of an instrument board, a navigation device, a room mirror, or various types of controllers, and regards circuit board 11 on which electronic component 11a is installed and display device 12 as main bodies. In addition, FIGS. 3 and 4 illustrate a state where a display surface of display device 12 is loaded downward.

Circuit board 11 and display device 12 have any rectangular shape, and cable 17 which electrically connects circuit board 11 and display device 12 to each other is connected to plural sides (here, three sides including two short sides and one long sides) of display device 12 in advance. In the exemplary embodiment, in one end portion 15a (refer to FIGS. 5A and 5B) of cable main body portion 15, such as the flexible plate board, an aspect to which reinforcing plate 16 for handling is bonded in advance is used as cable 17.

In an edge portion of a mounting surface of circuit board 11 which corresponds to the plural sides on which the cables 17 are connected to each other in display device 12, connector 13 on which mounted portion 15b formed in one end portion 15a of each of cable main body portions 15 is installed is provided. In connector 13, a terminal row for connection is formed on terminal surface 13b (refer to FIG. 13) of a bottom surface of mounter 13a on which mounted portion 15b is installed, and in a state where mounted portion 15b is inserted into and mounted onto connector 13, wiring pattern 15d (refer to FIGS. 5A and 5B) formed in mounted portion 15b comes into contact with the terminal rows.

Connector 13 is provided with a lock mechanism including cover member 14 for preventing mounted mounted portion 15b from falling out. Cover member 14 is provided to be freely open and closed with respect to connector 13, and in a state where electronic equipment 4 is conveyed into work stage 3 before mounted portion 15b is installed onto connector 13, and as illustrated in FIG. 3, cover member 14 is in a standing open state. In addition, as illustrated in FIG. 4, in a state where mounted portion 15b is installed onto connector 13 and the lock mechanism is operated, cover member 14 is pushed down and in a closed state, and mounted portion 15b is prevented from pressing in and falling out.

In FIG. 1, a raising and lowering operation and a rotation operation within a horizontal surface are possible with respect to work stage 3, and in the mounting work of cable 17 which regards electronic equipment 4 as a work target, by raising and lowering work stage 3, electronic equipment 4 is positioned at a predetermined work height. In addition, by rotating work stage 3, a side on which cable 17 which is the work target is provided in electronic equipment 4 is positioned to a predetermined working position by robot portion 5 which will be described hereinafter.

Corner post 2b stands in a corner portion of upper surface 2a of base 2, and horizontal frame 2c is built in the upper end portion of corner post 2b. On a side surface of frame 2c, operation panel 10 provided with a touch panel is disposed. An instruction input for instructing an operation in which robot portion 5 is regarded as a target is executed by a touch operation input via operation panel 10. Operation panel 10 has a display function, and notification in a case where abnormality or a defect is generated in a cable mounting operation performed by electronic equipment assembly apparatus 1 is displayed on operation panel 10. In addition, regarding a coordinate system of electronic equipment assembly apparatus 1, a direction which is horizontal from side to side when viewed from a front surface of electronic equipment assembly apparatus is an X axis, an axis orthogonal to the X axis in a forward-and-rearward direction is a Y axis, and an axis perpendicular to the X axis and the Y axis in an upward-and-downward direction is a Z axis.

On a lower surface of frame 2c, fixing base 6 in which a driving mechanism of robot portion 5 which will be described hereinafter is embedded is installed. Six servo driving mechanisms which are separately operated are embedded in fixing base 6, and each of the servo driving mechanisms separately drives six link members 7 which extend downward from fixing base 6. A lower end portion of link member 7 is bonded to base 8. In the above-described configuration, fixing base 6, link member 7, and base 8 configure robot portion 5.

Figure 2:
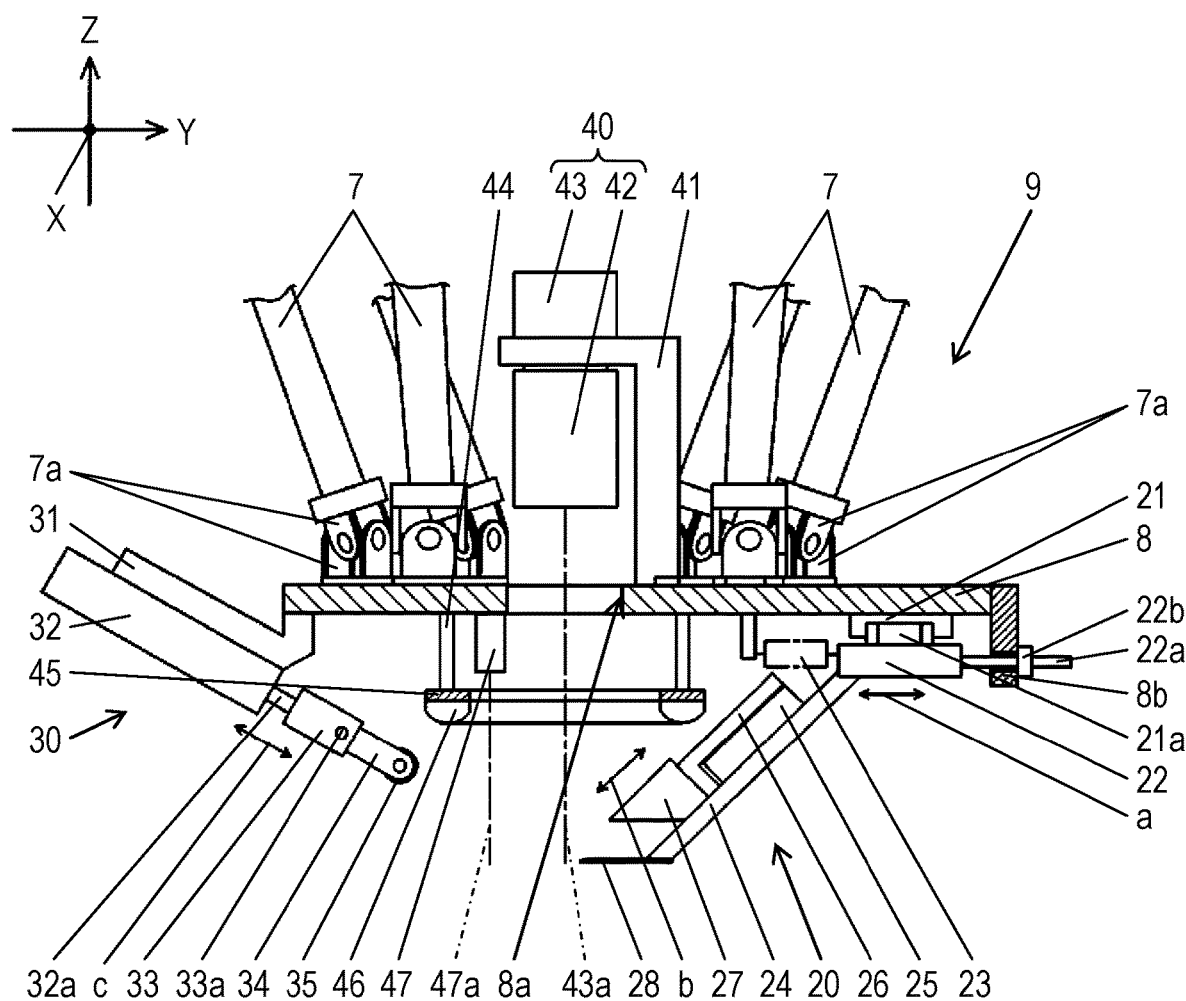
FIG. 2 is a configuration explanation view of a head which is embedded in a robot portion of the electronic equipment assembly apparatus of one exemplary embodiment of the disclosure.

Here, robot portion 5 is a six-degree-of-freedom type parallel link robot including six link members 7 which are separately operated, and the lower end portion of six link members 7 which extend downward from fixing base 6 is bonded to base 8 in head 9 which is a work unit that executes the mounting work of mounting cable 17 onto connector 13. As illustrated in FIG. 2, link member 7 is bonded to base 8 via universal joint 7a, and by the configuration, it is possible to perform the movement operation of six-degree-of-freedom with respect to base 8 by robot portion 5.

In base 8, cable holding tool 20 and connector lock tool 30 are installed, and further, imager 40 and illumination 46 are provided. Cable holding tool 20 has a function of holding cable 17 which is a target to be mounted onto connector 13, and connector lock tool 30 has a function of operating the lock mechanism provided in connector 13, that is, a function of pressing down and closing cover member 14 in connector 13 in a state where mounted portion 15b is installed.

By moving base 8 by robot portion 5, it is possible to relatively move cable holding tool 20 and connector lock tool 30 with respect to electronic equipment 4 held on work stage 3. In the mounting work for installing mounted portion 15b of cable 17 onto connector 13, robot portion 5, cable holding tool 20, and connector lock tool 30 are operated by controller 51 (refer to FIG. 10).

Robot portion 5 and cable holding tool 20 configure a cable mounting mechanism which holds cable 17 and installs cable 17 onto connector 13. In addition, robot portion 5 and connector lock tool 30 configure the lock operation mechanism which operates the lock mechanism provided in connector 13. In addition, in the exemplary embodiment, a configuration in which cable holding tool 20 and connector lock tool 30 are moved by common robot portion 5 is illustrated, but a configuration in which cable holding tool 20 and connector lock tool 30 are operated by separated driving mechanisms may be employed.

A specific configuration of cable holding tool 20 will be described. Opening portion 8a is provided at the driving center illustrating a center position of the plurality of universal joints 7a in base 8 illustrated in FIG. 2. On a lower surface in the vicinity of a side end portion separated in a rightward direction from opening portion 8a, guide rail 21 is installed in a Y direction. Moving block 22 is fixed to slider 21a mounted to be freely slidable on guide rail 21, and moving block 22 freely moves forward and backward (arrow a) in the Y direction.

Screw portion 22a provided to extend from a right end surface of moving block 22 penetrates a through hole provided in side end member 8b which extends downward from an outer end surface of base 8, and nut member 22b is fitted to the outer side of side end member 8b in screw portion 22a. In addition, spring member 23 which is a tension spring is bonded to a left end surface of moving block 22, and spring member 23 biases moving block 22 to a driving center side of base 8. In the configuration, nut member 22b functions as a stopper which regulates the stop position of moving block 22 biased to the driving center side, and by adjusting the position of nut member 22b, it is possible to adjust a relative position with respect to base 8 of cable holding tool 20 having the configuration which will be described hereinafter.

Chuck base 24 which extends obliquely downward toward the driving center side of base 8 is bonded to moving block 22. Actuator 25 provided with slider 26 which moves forward and backward (arrow b) toward the driving center side is installed on the upper surface side of chuck base 24. Furthermore, in the lower end portion of chuck base 24, blade 28 which is a thin plate member provided with a tapered portion is installed at a tip end in a horizontal posture. The position setting is performed such that a tip end portion of blade 28 is positioned below opening portion 8a, and by adjusting the position of nut member 22b in screw portion 22a, it is possible to adjust the position of blade 28.

A biasing force by spring member 23 acts as a buffer force with respect to blade 28. In other words, in a process of operating robot portion 5 and moving base 8, in a case where the tip end of blade 28 abuts against electronic equipment 4 or the like, the entire cable holding tool 20 moves as spring member 23 extends, and accordingly, a buffer action for preventing an excessive external force from acting on blade 28 functions.

Chuck block 27 having a trapezoidal side section is bonded to the end surface on the advancing side of slider 26. In a state where actuator 25 is operated and chuck block 27 advances obliquely downward, chuck surface 27a (refer to FIGS. 7A and 7B) of chuck block 27 abuts against blade 28. In the exemplary embodiment, in holding cable 17 by cable holding tool 20, by nipping reinforcing plate 16 from the upward-and-downward direction between blade 28 and chuck surface 27a of chuck block 27, cable 17 is held.

Next, a configuration of connector lock tool 30 will be described. In FIG. 2, bracket 31 which extends obliquely upward in the outer side direction is fixed to the lower surface on the left end portion side of base 8. In bracket 31, actuator 32 including rod 32a which moves forward and backward (arrow c) to the driving center side of base 8 is installed. Furthermore, in buffer 33 bonded to rod 32a, roller holder 34 on which roller 35 is installed which is the abutting portion in the tip end portion is installed. By driving actuator 32, roller holder 34 advances to the driving center side via buffer 33, and accordingly, roller 35 abuts against cover member 14 of connector 13, and operates the lock mechanism (refer to FIGS. 17A to 17C). In other words, connector lock tool 30 includes actuator 32 which performs an operation of forward and backward movement with respect to roller 35 that functions as an abutting portion which abuts against the lock mechanism provided in connector 13. In addition, roller 35 moves forward and backward obliquely downward by actuator 32, and is configured to become closest to cable holding tool 20 in a state of advancing obliquely downward (refer to FIGS. 17A to 17C).

Here, buffer 33 allows the rotation of roller holder 34 around holding axis 33a, and holds roller holder 34 in a state of being biased in a direction in which roller 35 is pressed downward. Accordingly, in an operation of moving roller 35 forward and backward by actuator 32, the shock is mitigated when roller 35 abuts against cover member 14 by the function of buffer 33. In other words, connector lock tool 30 is configured to include buffer 33 which absorbs the shock when roller 35 which is the abutting portion abuts against cover member 14 of the lock mechanism provided in connector 13.

On the upper surface of base 8, in bracket 41 which stands in the vicinity of opening portion 8a, imager 40 including optical lens portion 42 and camera 43 is installed in a downward posture by matching imaging optical axis 42a to the driving center. In a state where robot portion 5 is operated and head 9 is positioned above electronic equipment 4 held by work stage 3, by performing the imaging by imager 40, it is possible to obtain an image of mounted portion 15b of cable 17 held by cable holding tool 20 and an image of connector 13 mounted onto circuit board 11.

On the lower surface side of base 8, support member 44 stands below at a position which surrounds opening portion 8a. In the lower end portion of support member 44, illumination holding plate 45 which corresponds to an external shape of electronic equipment 4 is held, and illumination 46 configured of a light emitting body, such as an LED, is installed onto the lower surface of illumination holding plate 45. When performing the imaging by imager 40, illumination 46 is turned on and cable 17 and connector 13 which are imaging targets are illuminated. In other words, in base 8 of head 9, imager 40 and illumination 46 for detecting mounted portion 15b of cable 17 are provided. In addition, cable holding tool 20 and connector lock tool 30 are disposed to face each other with imaging optical axis 42a of camera 43 of imager 40 interposed therebetween. By the disposition, it is possible to image both of cable 17 held by cable holding tool 20 and connector 13 which is a target of locking by connector lock tool 30, by common imager 40.

Furthermore, in the vicinity of connector lock tool 30 side at a circumferential edge of opening portion 8a on a lower surface of base 8, distance measuring sensor 47 is installed in a posture in which measurement optical axis 47a is oriented downward. Distance measuring sensor 47 measures the distance from a measurement target surface of a measurement target positioned at measurement optical axis 47a to a measurement reference position of distance measuring sensor 47, that is, the height position of the measurement target surface. In the exemplary embodiment, in a state where distance measuring sensor 47 is positioned above connector 13, by measuring the height position of a predetermined position of connector 13 by distance measuring sensor 47, a locked state of the lock mechanism of connector 13 is checked.

Figure 5A:
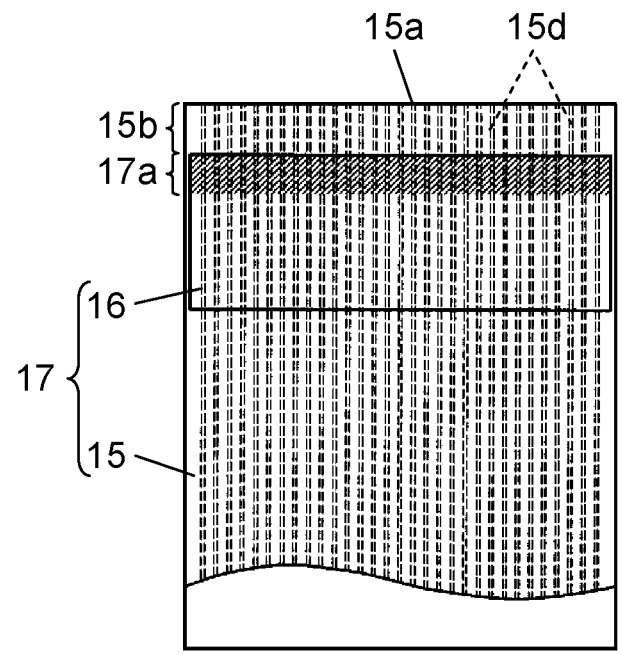
FIG. 5A is a configuration explanation view of the cable which is the work target of the electronic equipment assembly apparatus of one exemplary embodiment of the disclosure.
Figure 5B:
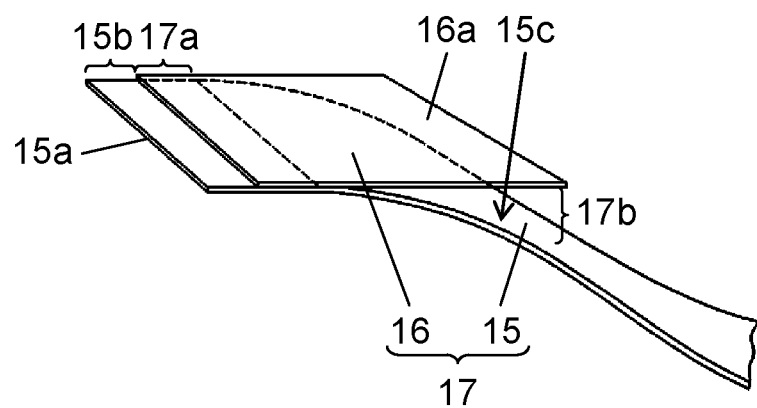
FIG. 5B is a configuration explanation view of the cable which is the work target of the electronic equipment assembly apparatus of one exemplary embodiment of the disclosure.

Next, with reference to FIGS. 5A and 5B, a specific configuration of cable 17 will be described. As illustrated in FIGS. 5A and 5B, cable 17 includes belt-shaped cable main body portion 15 in which mounted portion 15b to be mounted onto connector 13 is formed in one end portion 15a, and reinforcing plate 16 which is bonded to one end portion 15a side via bonding portion 17a on one surface 15c of cable main body portion 15. A surface opposite to one surface 15c to which reinforcing plate 16 is bonded in cable main body portion 15 is a pattern forming surface on which wiring pattern 15d is formed, and in the mounting work of cable 17 onto connector 13, wiring pattern 15d of mounted portion 15b is pressed to and brought into contact with terminal surface 13b formed in mounter 13a of connector 13. Accordingly, cable main body portion 15 of cable 17 is electrically connected to connector 13.

As illustrated in FIG. 5B, with respect to bonding portion 17a bonded to one surface 15c of cable main body portion 15 in reinforcing plate 16, at a part (free end portion 16a) positioned on a side opposite to one end portion 15a, port opening portion 17b separated from one surface 15c of cable main body portion 15 is formed. In the exemplary embodiment, when holding cable 17 by cable holding tool 20 illustrated in FIG. 2, blade 28 is inserted into port opening portion 17b and reinforcing plate 16 is nipped and held between blade 28 and chuck block 27 (refer to FIGS. 8A and 8B).

In a case where cable 17 having the above-described configuration is a target, cable holding tool 20 holds cable 17 by nipping and holding reinforcing plate 16. In other words, cable holding tool 20 illustrated in the exemplary embodiment is a chuck mechanism which nips reinforcing plate 16 from the upward-and-downward direction. In addition, the chuck mechanism includes blade 28 inserted into port opening portion 17b between cable main body portion 15 and reinforcing plate 16, and chuck block 27 which abuts against reinforcing plate 16 positioned on the upper surface of blade 28 and is pressed downward.

Figure 6A:
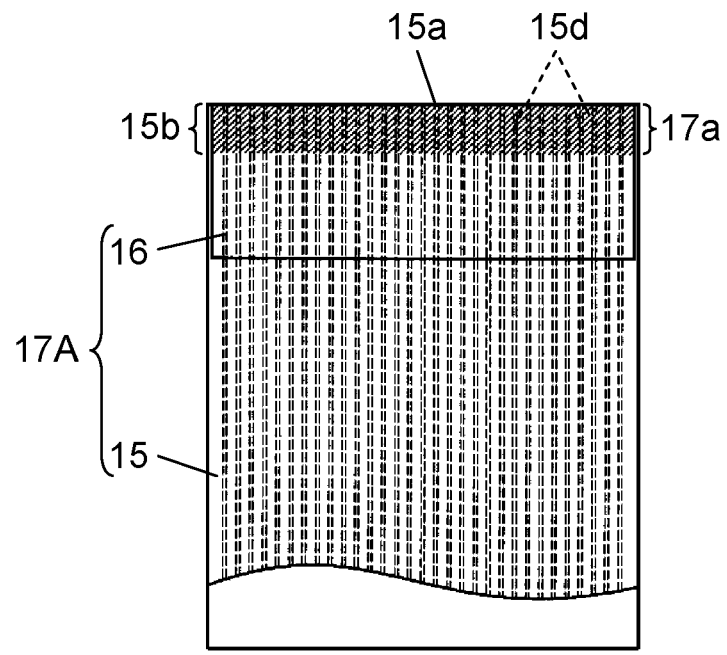
FIG. 6A is a configuration explanation view of the cable which is the work target of the electronic equipment assembly apparatus of one exemplary embodiment of the disclosure.
Figure 6B:
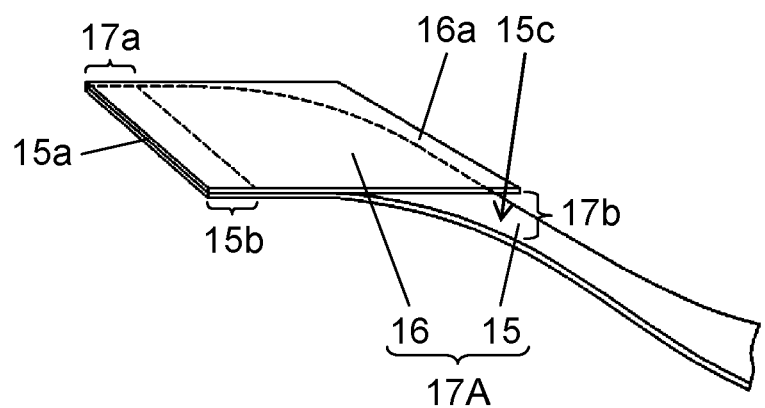
FIG. 6B is a configuration explanation view of the cable which is the work target of the electronic equipment assembly apparatus of one exemplary embodiment of the disclosure.

FIGS. 6A and 6B illustrate a modification example of cable 17 illustrated in FIGS. 5A and 5B. In other words, in cable 17, bonding portion 17a for bonding reinforcing plate 16 at a position that does not overlap mounted portion 15b provided on one end portion 15a side is set, but in cable 17A illustrated in FIGS. 6A and 6B, bonding portion 17a is set at the position which overlaps mounted portion 15b. In the example, when mounting cable 17A on connector 13, not only mounted portion 15b but also reinforcing plate 16 which overlaps mounted portion 15b is installed onto connector 13.

In addition, even in the modification example, similar to cable 17 illustrated in FIGS. 5A and 5B, at a part (free end portion 16a) positioned on a side opposite to one end portion 15a with respect to bonding portion 17a bonded to one surface 15c of cable main body portion 15 in reinforcing plate 16, port opening portion 17b separated from one surface 15c of cable main body portion 15 is formed. When holding cable 17 by cable holding tool 20, similarly, blade 28 is inserted into port opening portion 17b, and reinforcing plate 16 is nipped and held between blade 28 and chuck block 27 (refer to FIGS. 9A and 9B).

Figure 7A:
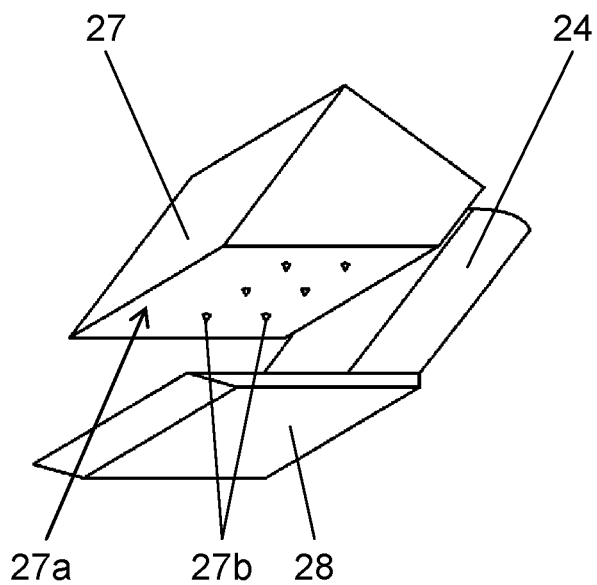
FIG. 7A is a configuration explanation view of a chuck block in a cable holding tool of the electronic equipment assembly apparatus of one exemplary embodiment of the disclosure.

Next, with reference to FIGS. 7A and 7B, chuck block 27 which is used in the chuck mechanism that nips the above-described reinforcing plate 16 provided in cable holding tool 20 will be described in detail. FIG. 7A illustrates a state where chuck block 27 is separated from blade 28, and a plurality of spike claw 27b are provided to be projected on chuck surface 27a of chuck block 27. In spike claw 27b, in a state of a chuck which nips reinforcing plate 16 between blade 28 and chuck surface 27a, by being slightly bitten into a surface of reinforcing plate 16, nipped reinforcing plate 16 is prevented from sliding and falling out. In other words, in cable holding tool 20, on chuck surface 27a of chuck block 27 which abuts against reinforcing plate 16, a slip stopper is formed. In addition, the slip stopper is not limited to spike claw 27b, and for example, various methods, such as surface roughening with respect to chuck surface 27a, can be used.

Figure 7B:
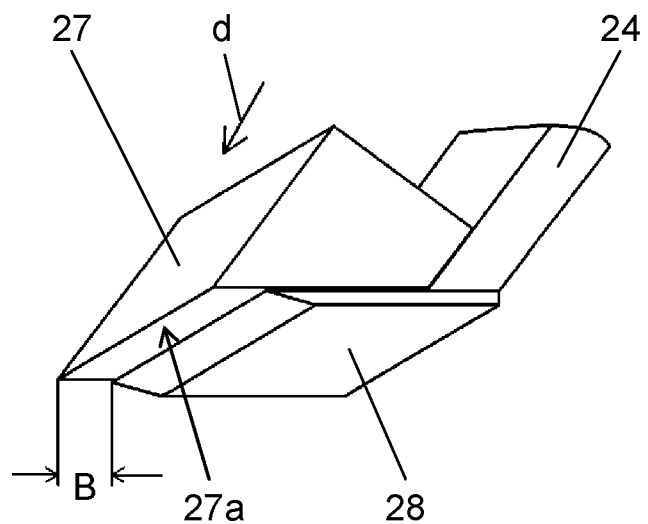
FIG. 7B is a configuration explanation view of the chuck block in the cable holding tool of the electronic equipment assembly apparatus of one exemplary embodiment of the disclosure.

FIG. 7B illustrates a state where actuator 25 (refer to FIG. 2) is driven, chuck block 27 is lowered along chuck base 24 (arrow d), and chuck surface 27a is near blade 28 and in a closed state. In the state, a size of chuck block 27 and blade 28 is set such that a stretching portion which stretches only by a predetermined width B from a tip end of blade 28 is formed in the tip end portion of chuck surface 27a. By setting the size to the size of chuck block 27 in cable holding tool 20, as illustrated in FIGS. 8A to 9B, effects of correcting the deformation of cables 17 and 17A are obtained in a state of being held by cable holding tool 20.

Figure 8A:
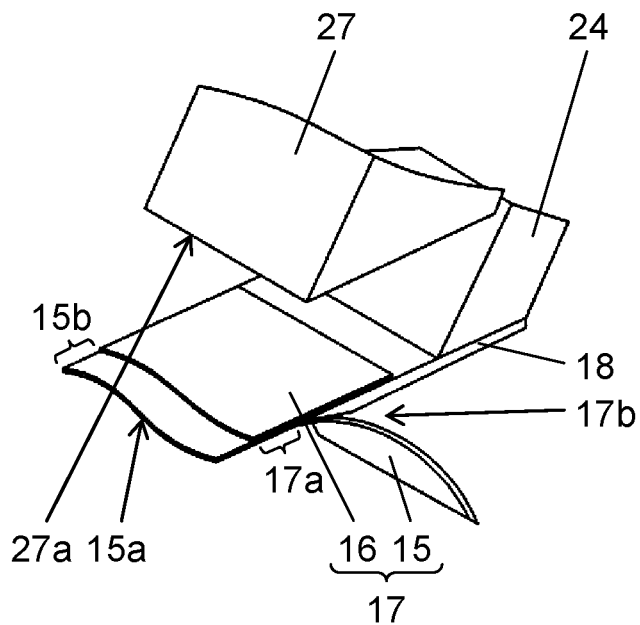
FIG. 8A is a functional explanation view of the chuck block in the cable holding tool of the electronic equipment assembly apparatus of one exemplary embodiment of the disclosure.

FIG. 8A illustrates a case where cable 17 illustrated in FIGS. 5A and 5B is a holding target. As illustrated in FIG. 8A, in a state where mounted portion 15b protrudes in one end portion 15a of cable main body portion 15, in cable 17 having a configuration in which reinforcing plate 16 is bonded to cable main body portion 15, in a state where blade 28 is inserted into port opening portion 17b between cable main body portion 15 and reinforcing plate 16, there is a case where deformation which causes a curved shape or a wavy shape in the width direction is generated in one end portion 15a in which mounted portion 15b is formed.

Figure 8B:
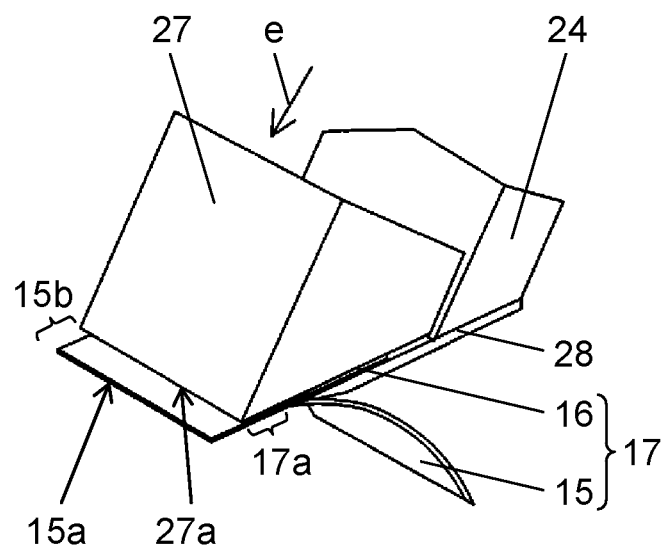
FIG. 8B is a functional explanation view of the chuck block in the cable holding tool of the electronic equipment assembly apparatus of one exemplary embodiment of the disclosure.

Even in this case, as illustrated in FIG. 8B, in a state where chuck block 27 is close to blade 28 (arrow e) and reinforcing plate 16 is nipped between chuck surface 27a and blade 28, chuck surface 27a of chuck block 27 stretches to the upper surface of bonding portion 17a which bonds at least cable main body portion 15 and reinforcing plate 16 to each other when nipping reinforcing plate 16. Accordingly, the above-described deformation of the part which is near one end portion 15a of cable main body portion 15 is corrected in accordance with chuck surface 27a having a shape of a flat surface.

Figure 9A:
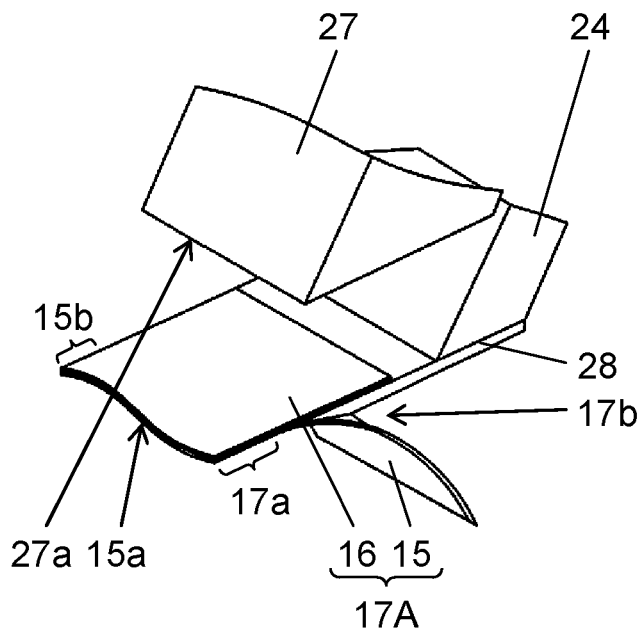
FIG. 9A is a functional explanation view of the chuck block in the cable holding tool of the electronic equipment assembly apparatus of one exemplary embodiment of the disclosure.

Similarly, similar effects can be obtained even in a case where cable 17A illustrated in FIGS. 6A and 6B is a holding target. In other words, as illustrated in FIG. 9A, even in cable 17A having a configuration in which reinforcing plate 16 is bonded to cable main body portion 15 in a state where mounted portion 15b and bonding portion 17a overlap each other in one end portion 15a of cable main body portion 15, in a state where blade 28 is inserted into port opening portion 17b between cable main body portion 15 and reinforcing plate 16, there is a case where the deformation into a curved shape or a wavy shape in the width direction is generated in one end portion 15a in which mounted portion 15b is formed.

Figure 9B:
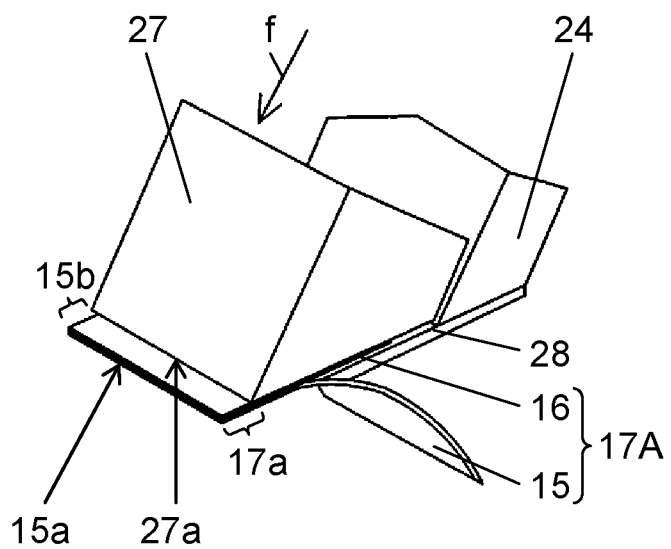
FIG. 9B is a functional explanation view of the chuck block in the cable holding tool of the electronic equipment assembly apparatus of one exemplary embodiment of the disclosure.

Even in the case, as illustrated in FIG. 9B, in a state where chuck block 27 is close to blade 28 (arrow f) and reinforcing plate 16 is nipped between chuck surface 27a and blade 28, chuck surface 27a of chuck block 27 stretches to the upper surface of bonding portion 17a which bonds at least cable main body portion 15 and reinforcing plate 16 to each other when nipping reinforcing plate 16. Accordingly, the above-described deformation of the part which is near one end portion 15a of cable main body portion 15 is corrected in accordance with chuck surface 27a having a shape of a flat surface.

Figure 10:
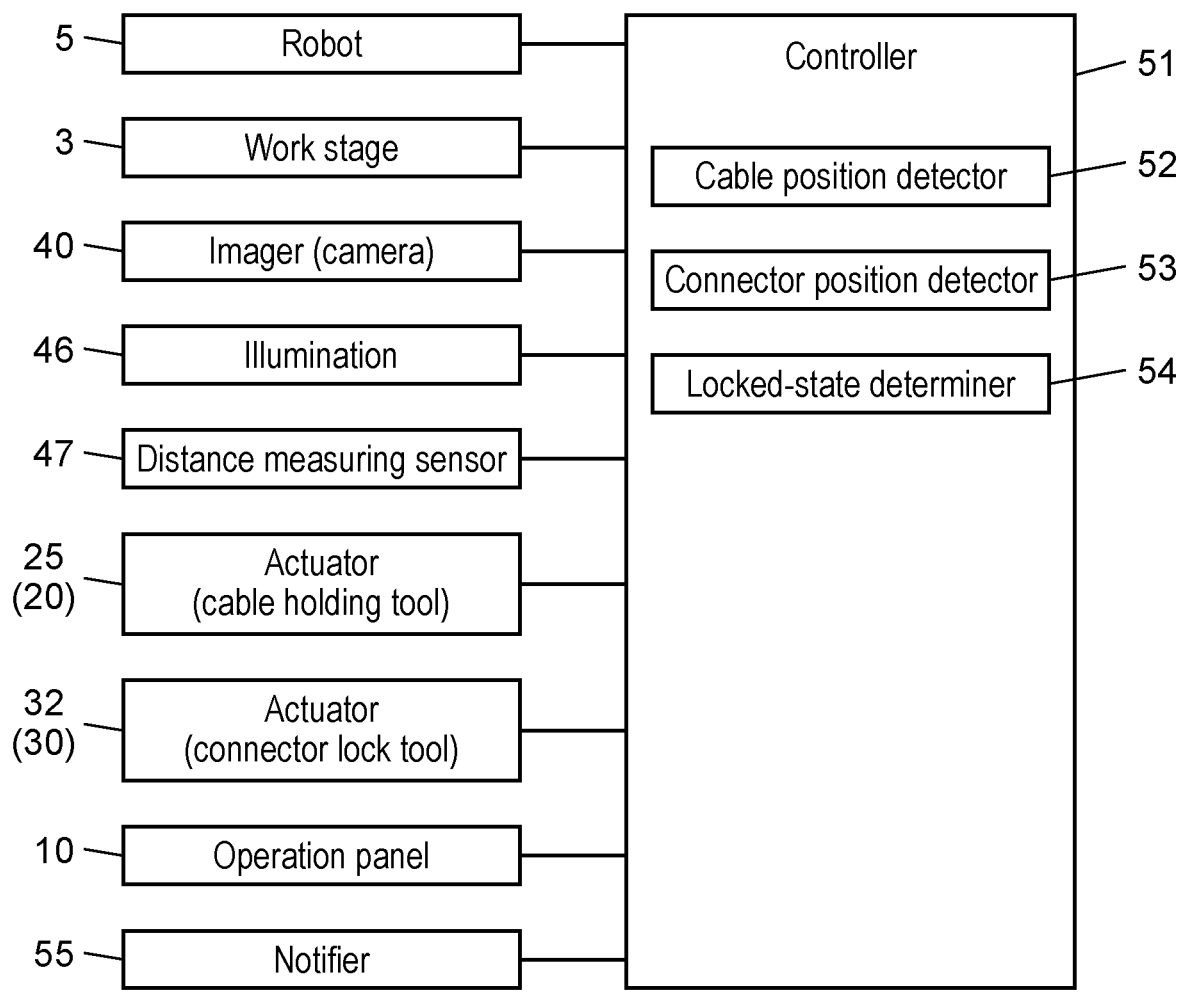
FIG. 10 is a block diagram illustrating a configuration of a control system of the electronic equipment assembly apparatus of one exemplary embodiment of the disclosure.

Next, with reference to FIG. 10, a configuration of a control system of electronic equipment assembly apparatus 1 will be described. In FIG. 10, controller 51 connects robot portion 5, work stage 3, imager 40, illumination 46, distance measuring sensor 47, actuator 25 (cable holding tool 20), actuator 32 (connector lock tool 30), operation panel 10, and notifier 55 to each other.

Figure 11:
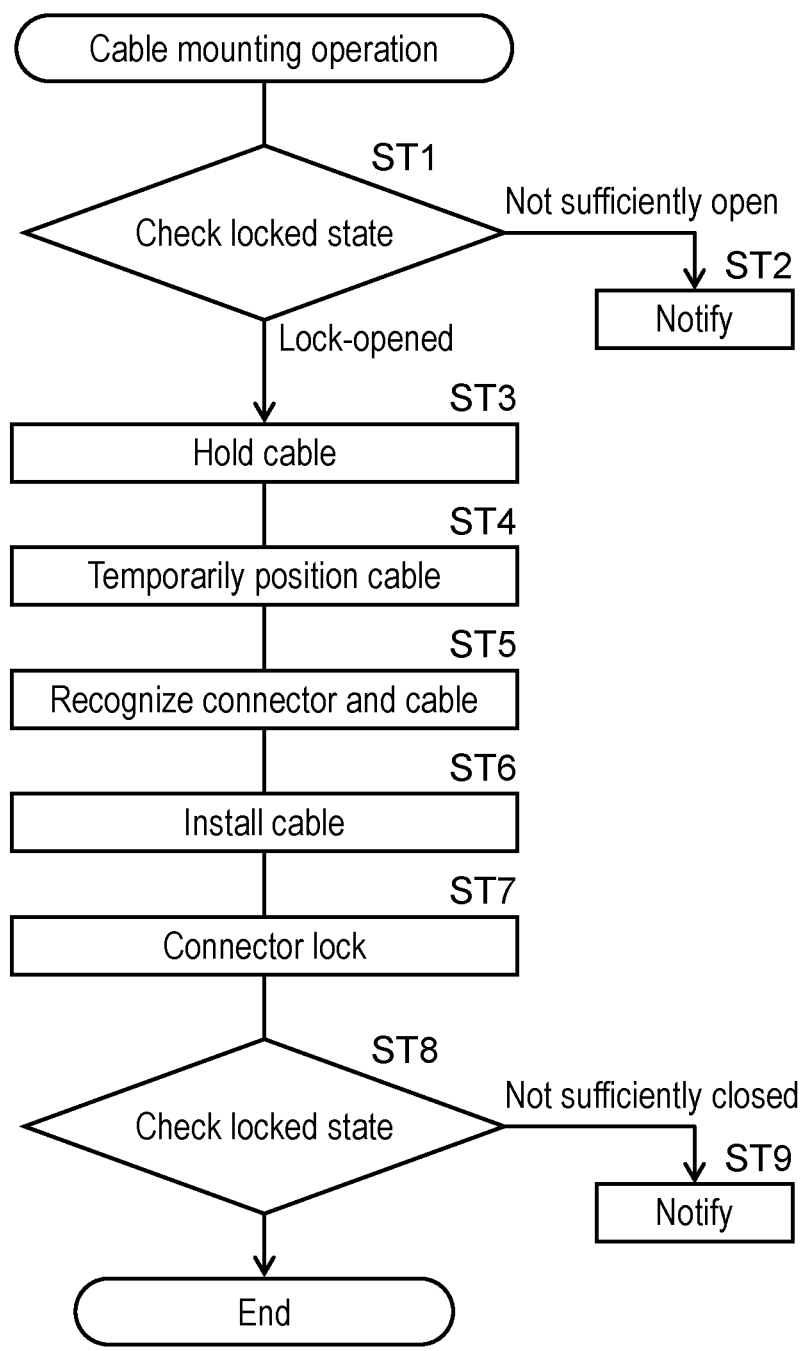
FIG. 11 is a flowchart illustrating a cable mounting operation in an electronic equipment assembly method of one exemplary embodiment of the disclosure.

As controller 51 controls robot portion 5, work stage 3, actuator 25 of cable holding tool 20, and actuator 32 of connector lock tool 30, the cable mounting operation illustrated in FIG. 11 is executed. In other words, in the above-described control processing, by operating robot portion 5, cable holding tool 20, and connector lock tool 30, controller 51 executes the cable mounting operation of mounting mounted portion 15b of cable 17 on connector 13. In addition, in other words, controller 51 controls the cable mounting mechanism configured of cable holding tool 20 and robot portion 5, and the lock operation mechanism configured of connector lock tool 30 and robot portion 5.

In the execution process of the cable mounting operation, controller 51 controls imager 40 and illumination 46, executes imaging processing for detecting the position of mounted portion 15b of cable 17 and connector 13, and executes distance measuring processing for checking a locked state in connector 13 by controlling distance measuring sensor 47. Operation commands for executing the processing are input via operation panel 10, and accordingly, controller 51 executes the predetermined control processing. Notifier 55 performs processing of displaying the notification of a case where abnormality or a defect is generated in the execution process of the cable mounting operation by electronic equipment assembly apparatus 1, on operation panel 10.

In addition, controller 51 includes cable position detector 52, connector position detector 53, and locked-state determiner 54, as internal control processing functions. Cable position detector 52 detects the position of mounted portion 15b based on a recognition screen obtained by imaging mounted portion 15b of cable 17 in a state of being held by cable holding tool 20 by imager 40. Connector position detector 53 detects the position of connector 13 based on a recognition screen obtained by imaging connector 13 which is similarly a mounting target by imager 40. In the cable mounting operation of mounting mounted portion 15b onto connector 13, controller 51 controls movement of cable holding tool 20 by robot portion 5 based on the position detection result of mounted portion 15b and connector 13.

Locked-state determiner 54 performs processing of determining the state of the lock mechanism provided in connector 13 based on the result of the measurement in which connector 13 is a target by distance measuring sensor 47, or the image obtained by imaging connector 13 by imager 40. Locked-state determiner 54 and distance measuring sensor 47, and locked-state determiner 54 and imager 40 configure the locked-state checker which checks the state of the lock mechanism provided in connector 13. In electronic equipment assembly apparatus 1 illustrated in the exemplary embodiment, two aspects exist as the locked-state checker as will be described hereinafter, and any of the aspects is selected and used.

First, in a first aspect, the locked-state checker includes distance measuring sensor 47 which measures the state of the lock mechanism provided in connector 13, that is, the height of a location at which the height changes in accordance with an open and closed state of cover member 14 that configures the lock mechanism, and locked-state determiner 54 which determines the state of the lock mechanism based on the measurement result of distance measuring sensor 47. In addition, in a second aspect, the locked-state checker includes imager 40 which can image connector 13, and locked-state determiner 54 which determines the state of the lock mechanism provided in connector 13 based on the image imaged by imager 40.

In addition, in any of the above-described aspects, the locked-state checker checks the state of the lock mechanism of connector 13 before mounted portion 15b of cable 17 is installed, and as a result of the checking, in a case where it is determined that the lock mechanism is functioning or in a state where the work for installing mounted portion 15b is interfered, controller 51 stops the mounting work of mounted portion 15b of cable 17 with respect to connector 13, and notifies the operator of the contents by notifier 55. Furthermore, the locked-state checker checks the state of the lock mechanism of connector 13 on which mounted portion 15b of cable 17 is installed, and as a result of the checking, in a case where it is determined that the lock mechanism is not in a sufficiently functioning state, controller 51 notifies the operator of the contents by notifier 55.

Next, with reference to the flow of FIG. 11 and each drawing, the cable mounting operation executed by electronic equipment assembly apparatus 1, that is, an electronic equipment assembly method for installing mounted portion 15b of cables 17 and 17A illustrated in FIGS. 5A to 6B onto connector 13 of electronic equipment 4 will be described. In the electronic equipment assembly method described here, cables 17 and 17A including belt-shaped cable main body portion 15 in which mounted portion 15b is formed in one end portion 15a, and reinforcing plate 16 bonded to one end portion 15a side on one surface 15c of cable main body portion 15, are regarded as the work target. In addition, in each of the drawings following FIG. 12, only cable 17 is illustrated, and only cable 17 is described in the description, but a case where cable 17A is the target is also similar thereto.

In addition, in cable 17, at the part positioned on the side opposite to one end portion 15a with respect to bonding portion 17a bonded to one surface 15c of cable main body portion 15 in reinforcing plate 16, an aspect in which port opening portion 17b separated from one surface 15c is formed is achieved, reinforcing plate 16 is held by cable holding tool 20, and the cable mounting operation is performed.

Connector 13 which is the target of the cable mounting operation includes the lock mechanism which prevents mounted mounted portion 15b from falling out. The lock mechanism includes cover member 14 (refer to FIG. 13) that performs the opening and closing operation by rotating around holding axis 14a, and by pressing down cover member 14 in an open state by connector lock tool 30, the lock mechanism is operated.

Figure 12:
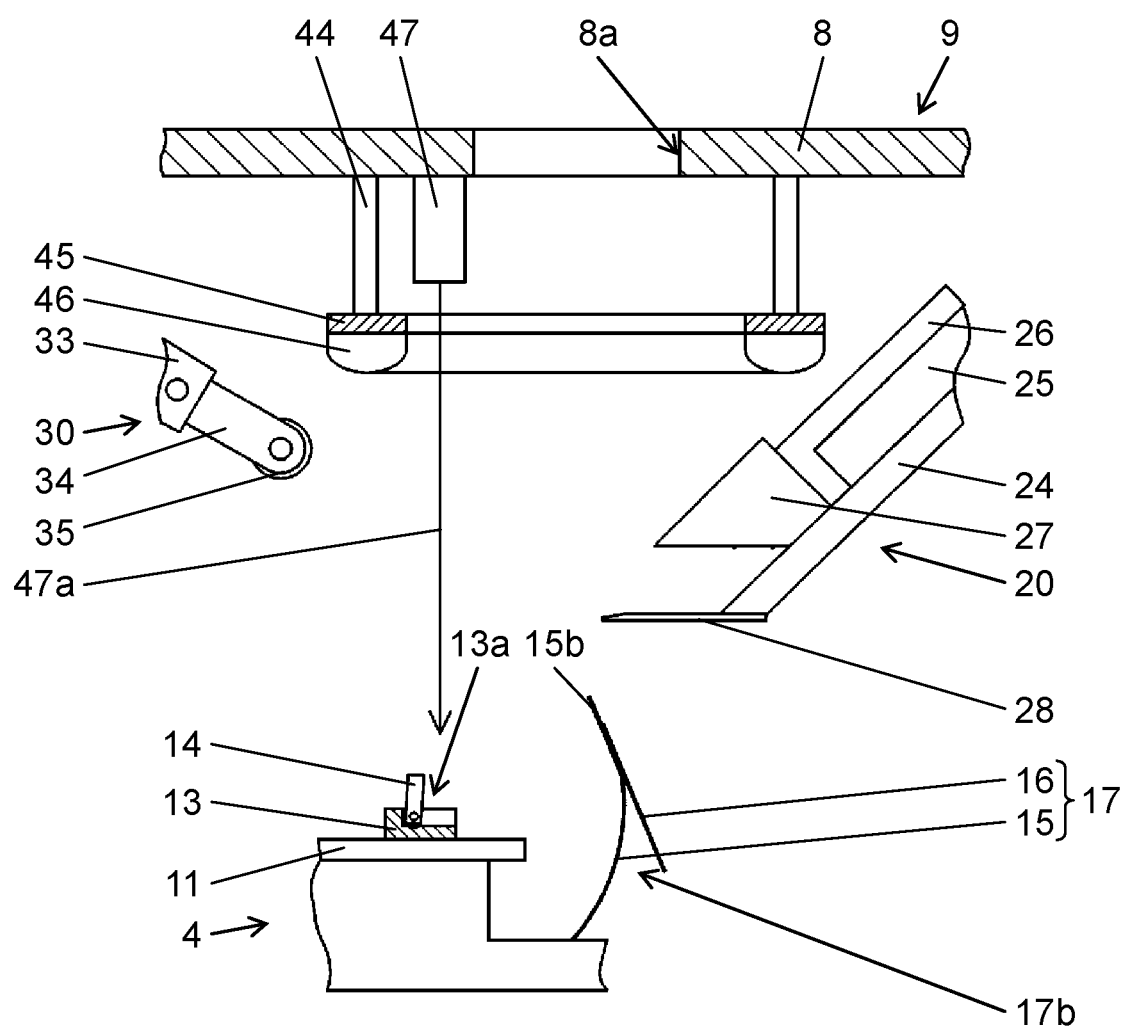
FIG. 12 is an explanation view of checking of a state of a connector in the electronic equipment assembly method of one exemplary embodiment of the disclosure.

When starting the cable mounting operation, first, the checking of the locked state is executed by the locked-state checker provided in electronic equipment assembly apparatus 1 (ST1). In the checking of the locked state, first, robot portion 5 is operated, head 9 is moved, and as illustrated in FIG. 12, distance measuring sensor 47 is positioned above connector 13 which is the work target, and measurement optical axis 47a is positioned to be identical to the measurement target position of connector 13. At this time, at the position which corresponds to connector 13 which is the work target in electronic equipment 4, cable 17 in which cable main body portion 15 is connected to display device 12 in advance (refer to FIG. 3) is positioned in a posture in which mounted portion 15b is oriented upward.

The checking of the state of the lock mechanism by the locked-state checker measures and determines the height of the location at which the height changes in accordance with the state of the lock mechanism. Here, as the location at which the height changes, as illustrated in the example in FIG. 13, two of (A) a position (upper surface 13c of connector 13), (B) a position (upper end portion of cover member 14 in an open state), and (C) a position (terminal surface 13b of mounter 13a of connector 13) are selected and used.

For example, when the difference in height of the two positions is calculated by measuring the height of the A position and the B position by distance measuring sensor 47, and the difference in height is equal to or greater than a predetermined value, it is determined that cover member 14 is in a normally open state and the lock mechanism is in a released state. In addition, instead of the (B) position, regarding the (C) position as the target of the height measurement, based on the height of the two positions acquired by measuring the height of the A position and the C position by distance measuring sensor 47, similarly, the state of the lock mechanism may be determined. In addition, the checking of the state of the lock mechanism by the locked-state checker may be performed based on the image of connector 13 imaged by imager 40. In the case, the state of the lock mechanism, that is, whether or not cover member 14 is in an open state, is determined by the state of the image of a flat surface of cover member 14 in connector 13.

In addition, in the checking of the locked state of (ST1), in a case where the open state is not sufficiently checked, controller 51 notifies the operator of the contents by notifier 55 (ST2). In other words, in a case where it is determined that the state of the lock mechanism of connector 13 on which cables 17 and 17A are not mounted is a state where cover member 14 is closed state and the lock mechanism is functioning, or that the state of the lock mechanism is a state where the work for installing cables 17 and 17A is interfered, such as a state where cover member 14 is not sufficiently open, the cable mounting mechanism configured of robot portion 5 and cable holding tool 20 stops the mounting work of cables 17 and 17A with respect to connector 13, and notifier 55 notifies the operator of the contents. Accordingly, it is possible to prevent a defect, such as a mounting error caused by executing the cable mounting operation with respect to connector 13 in an abnormal state.

Figure 14A:
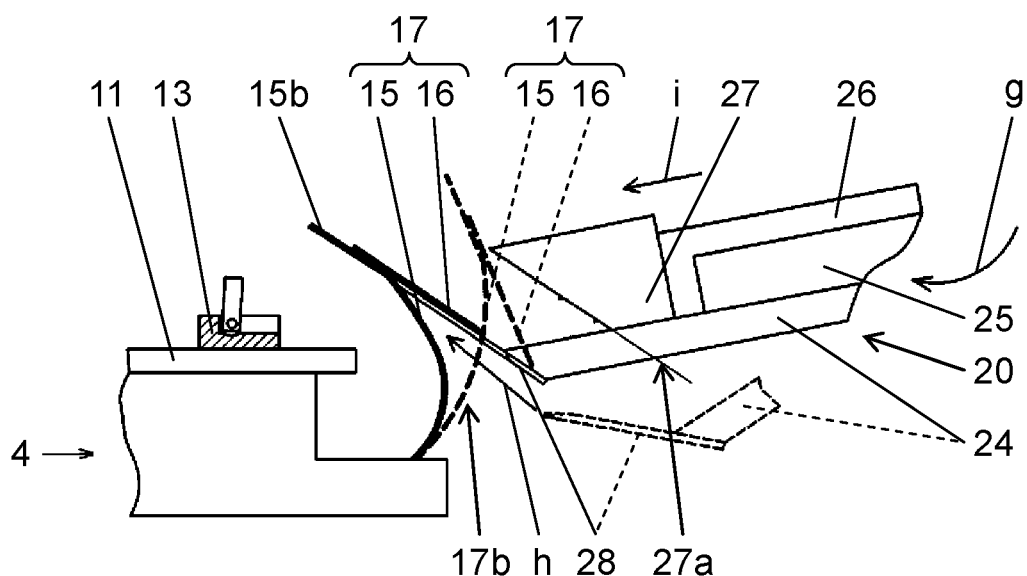
FIG. 14A is an operation explanation view of holding and positioning the cable in the electronic equipment assembly method of one exemplary embodiment of the disclosure.

Next, cable 17 is held by cable holding tool 20 (ST3). Cable holding tool 20 which is used here includes blade 28 which is inserted into port opening portion 17b between cable main body portion 15 and reinforcing plate 16, and chuck block 27 which presses reinforcing plate 16 positioned on the upper surface of blade 28 downward. In the holding operation of cable 17, as illustrated in FIG. 14A, a scooping operation (arrow g) is performed with respect to cable holding tool 20 by robot portion 5. Accordingly, blade 28 is inserted into port opening portion 17b between cable main body portion 15 and reinforcing plate 16 of cable 17 in a state of being connected to electronic equipment 4 in advance (arrow h), the upper surface of blade 28 is brought into contact with and is held by reinforcing plate 16.

In addition, after this, actuator 25 is driven, chuck block 27 is close to blade 28 (arrow i), and reinforcing plate 16 is nipped and held between blade 28 and chuck surface 27a of chuck block 27. In other words, in holding cable 17 in the cable mounting operation, reinforcing plate 16 is held by cable holding tool 20. In holding reinforcing plate 16 by cable holding tool 20, since spike claw 27*b* (refer to FIGS. 7A and 7B) which functions as a slip stopper is formed on chuck surface 27*a* of chuck block 27, it is possible to prevent reinforcing plate 16 from falling out by a slip, and to stably hold cable 17.

Furthermore, since chuck surface 27*a* of chuck block 27 stretches from the tip end of blade 28, the deformation of mounted portion 15*b* of cable main body portion 15 in a state of extending from reinforcing plate 16 nipped between blade 28 and chuck surface 27*a* is corrected in accordance with chuck surface 27*a* having a shape of a flat surface (refer to FIGS. 8A and 8B). Accordingly, in the imaging of mounted portion 15*b* and the mounting of mounted portion 15*b* onto connector 13 which will be described hereinafter, it is possible to prevent a defect caused by the deformation.

After this, cable temporary positioning is performed (ST4). Here, mounted portion 15*b* of cable 17 held by cable holding tool 20 is temporarily positioned with respect to connector 13 for the imaging of position detection (ST4). In other words, as illustrated in FIG. 14B, cable holding tool 20 is positioned such that mounted portion 15*b* becomes close to connector 13 in a horizontal posture and mounted portion 15*b* is positioned within a focal range FZ in the imaging by imager 40 together with connector 13.

In addition, in the state, connector 13 and cable 17 which are targets of the mounting work are imaged and recognized by imager 40 (ST5). In other words, by obtaining the images of mounted portion 15*b* which is temporarily positioned in (ST4) and connector 13 by camera 43 of imager 40, recognition processing for acquiring a relative positional relationship of mounted portion 15*b* and connector 13 based on the image is performed.

Figure 15:
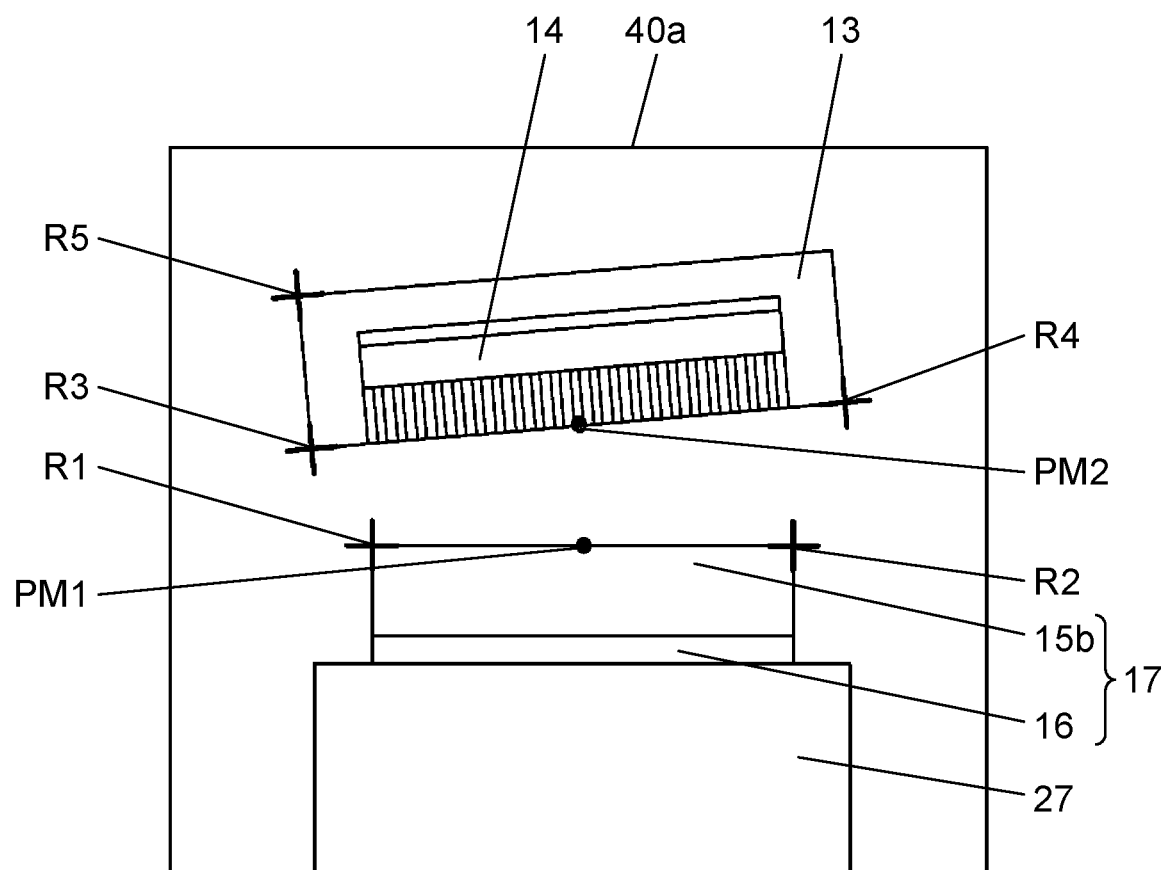
FIG. 15 is an explanation view of an image for position recognizing of the connector and the cable in the electronic equipment assembly method of one exemplary embodiment of the disclosure.

FIG. 15 illustrates recognized image 40*a* which is obtained in (ST5) and is the target of the recognition processing. In other words, in recognized image 40*a*, an image of connector 13 before the cable mounting in which cover member 14 that configures the lock mechanism is in an open state, and an image when the tip end portion of chuck block 27 of cable holding tool 20 which holds cable 17 mounted onto connector 13 is viewed in a plan view, appear. In recognized image 40*a*, since the positional relationship between imager 40 and cable holding tool 20 is fixed, chuck block 27 always appears at a fixing position which is identical to an image frame direction.

Figure 14B:
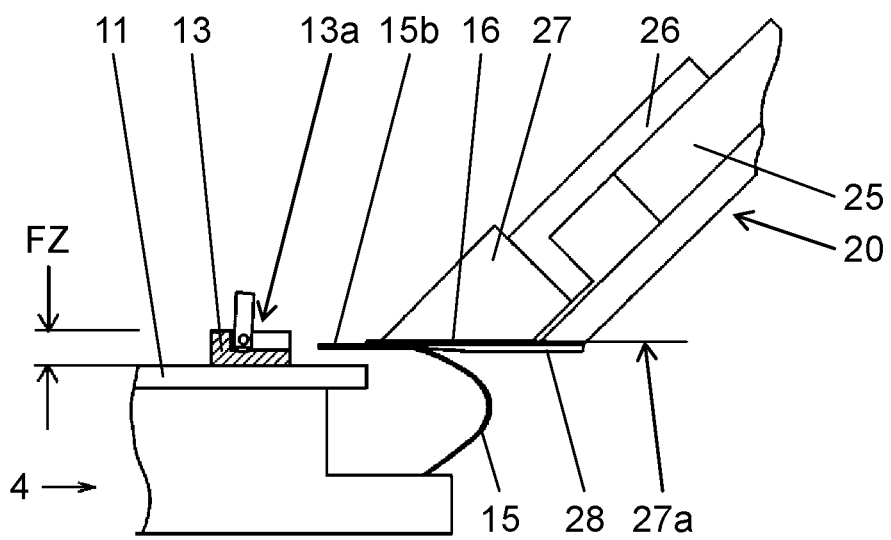
FIG. 14B is an operation explanation view of holding and positioning the cable in the electronic equipment assembly method of one exemplary embodiment of the disclosure.

Meanwhile, reinforcing plate 16 and mounted portion 15*b* which are nipped and held by chuck block 27 and blade 28 show a slight positional shift caused by the positional difference or the like in the holding operation illustrated in FIGS. 14A and 14B. Furthermore, connector 13 is also in a positionally shifted state caused by a position holding error of electronic equipment 4 on work stage 3 or a positional error of connector 13 in electronic equipment 4. In other words, the relative positional relationship between connector 13 and mounted portion 15*b* mounted onto connector 13 varies for each of connectors 13 which is the mounting work target.

Therefore, when inserting and mounting mounted portion 15*b* into mounter 13*a* of connector 13, position correction data obtained by correcting variance of the relative positional relationship is obtained by recognized image 40*a* illustrated in FIG. 15. In other words, by acquiring positions of recognition points R1 and R2 for detecting the position of mounted portion 15*b*, a center point of recognition points R1 and R2 is a representative point PM1 which shows the position of mounted portion 15*b*. Furthermore, by acquiring positions of recognition points R3, R4, and R5 for detecting the position of connector 13, a center point of recognition points R4 and R5 is a representative point PM2 which shows the position of connector 13.

Figure 16A:
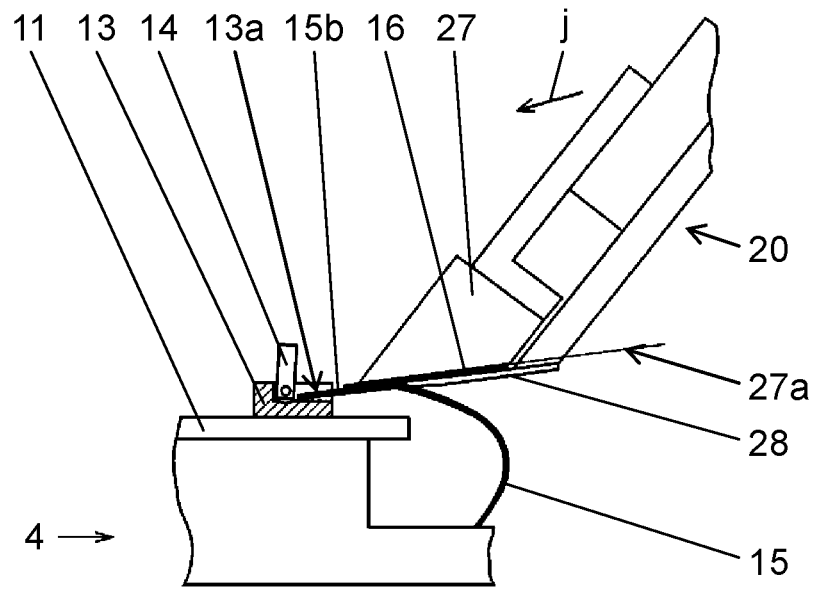
FIG. 16A is an explanation view of a mounting operation of the cable onto the connector in the electronic equipment assembly method of one exemplary embodiment of the disclosure.

After this, the mounting of cable 17 onto connector 13 is performed (ST6). In the mounting operation, cable holding tool 20 which holds cable 17 is positioned such that each of representative points PM1 and PM2 is in an appropriate positional relationship. In other words, as illustrated in FIG. 16A, cable holding tool 20 is moved (arrow j), and the tip end portion of mounted portion 15*b* of cable 17 is inserted from a slightly oblique direction into mounter 13*a* of connector 13 of electronic equipment 4. At this time, cover member 14 is in a standing open state, and insertion of mounted portion 15*b* is not interfered.

Figure 16B:
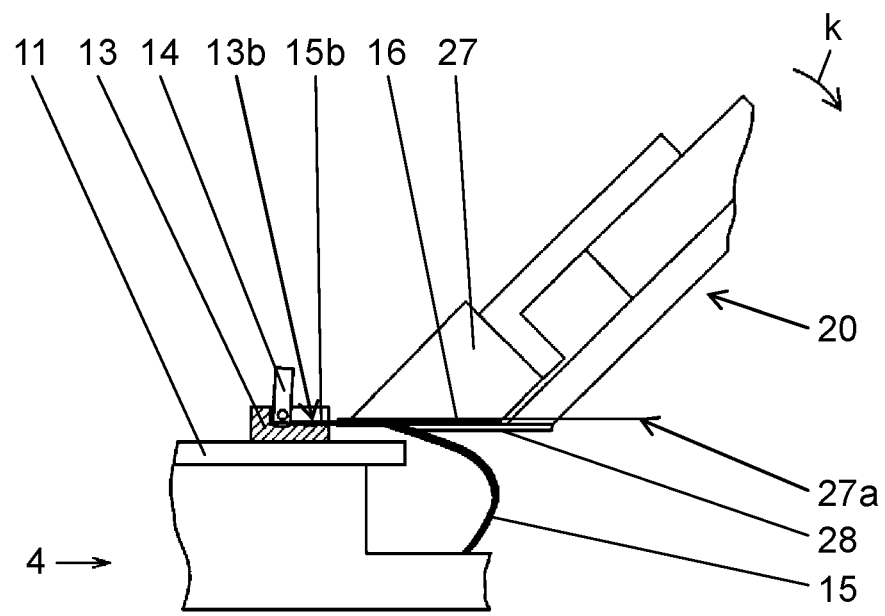
FIG. 16B is an explanation view of a mounting operation of the cable onto the connector in the electronic equipment assembly method of one exemplary embodiment of the disclosure.

In addition, when mounting mounted portion 15*b* of cable 17 onto terminal surface 13*b* of connector 13 of electronic equipment 4, based on the relative positional relationship between mounted portion 15*b* and connector 13 which is acquired in (ST5), the movement of cable holding tool 20 is controlled. Next, as illustrated in FIG. 16B, by adjusting the posture of cable holding tool 20 (arrow k), wiring pattern 15*d* formed in mounted portion 15*b* is brought into contact with terminal surface 13*b* of connector 13 by setting mounted portion 15*b* to be in a horizontal posture.

Figure 17A:
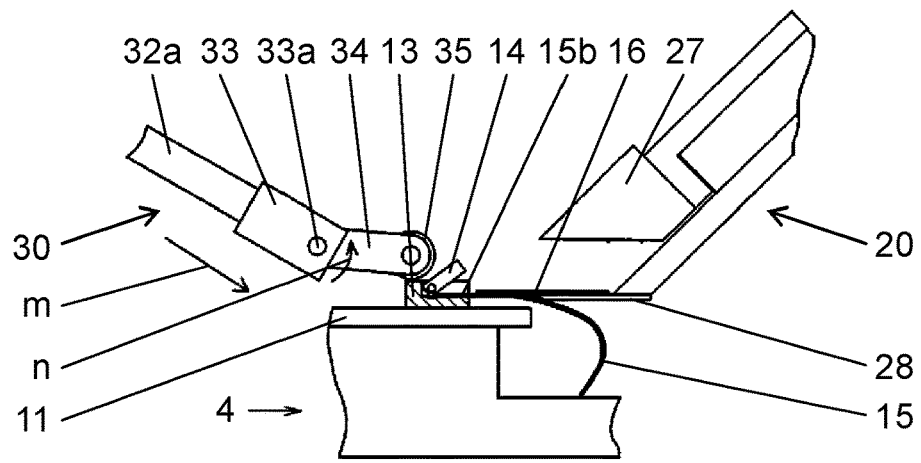
FIG. 17A is an explanation view of an operation of a lock mechanism of the connector in the electronic equipment assembly method of one exemplary embodiment of the disclosure.

After this, connector lock is performed (ST7). Here, the lock mechanism including connector 13 is operated by connector lock tool 30. In other words, as illustrated in FIG. 17A, first, chuck block 27 is raised in cable holding tool 20 and the chuck state of reinforcing plate 16 is released. Next, by operating actuator 32 (refer to FIG. 2) in connector lock tool 30, rod 32*a* and buffer 33 bonded to rod 32*a* protrude (arrow m). Accordingly, roller 35 of the tip end portion of roller holder 34 mounted onto buffer 33 moves to the upper surface side of connector 13, abuts against cover member 14 while rotating the upper surface of connector 13, and pressed down thereto.

At this time, roller holder 34 is held to be freely rotatable via holding axis 33*a* by buffer 33, and is biased downward, roller 35 rotates in an arrow n direction around holding axis 33*a* when abutting against connector 13 and cover member 14, and accordingly, the shock of roller 35 when abutting against connector 13 and cover member 14 is mitigated.

Figure 17B:
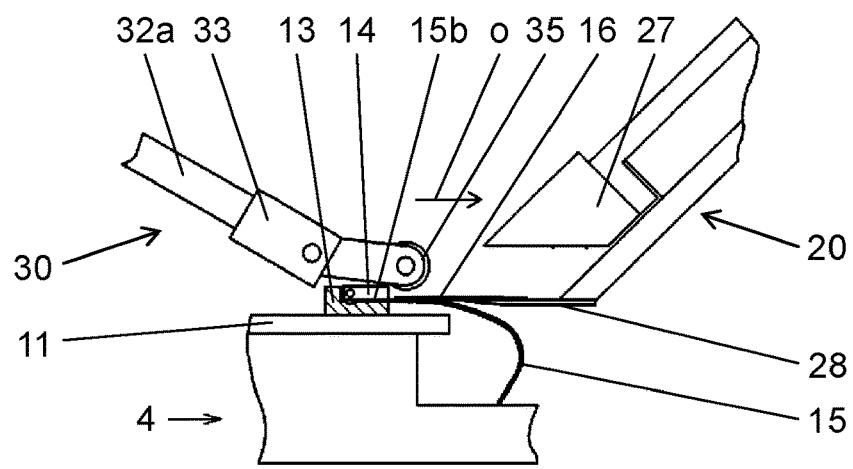
FIG. 17B is an explanation view of the operation of the lock mechanism of the connector in the electronic equipment assembly method of one exemplary embodiment of the disclosure.

Next, by operating robot portion 5 and by moving base 8 in the rightward direction (arrow o), as illustrated in FIG. 17B, roller 35 rotates on the upper surface of connector 13 and presses down and closes cover member 14. Accordingly, cover member 14 presses mounted portion 15*b*, the lock mechanism is operated in connector 13, and mounted portion 15*b* is prevented from falling out. In addition to this, blade 28 is separated from the part between the lower surface of reinforcing plate 16 and cable main body portion 15 in cable holding tool 20, and the holding of cable 17 by cable holding tool 20 is released.

Figure 13:
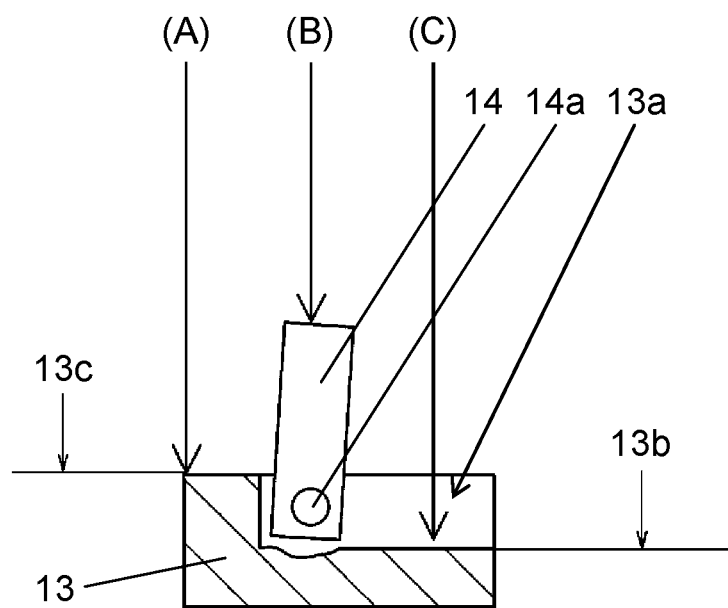
FIG. 13 is an explanation view of checking of the state of the connector in the electronic equipment assembly method of one exemplary embodiment of the disclosure.
Figure 17C:
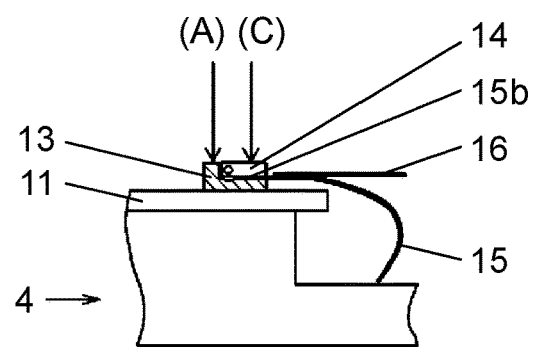
FIG. 17C is an explanation view of the operation of the lock mechanism of the connector in the electronic equipment assembly method of one exemplary embodiment of the disclosure.

In addition, after this, the checking of the locked state is performed (ST8). In other words, actuator 32 returns to an original position in connector lock tool 30, roller holder 34 or roller 35 moves backward, and robot portion 5 is operated and moves base 8 to a position illustrated in FIG. 12, that is, a position at which the height measurement of connector 13 is possible by distance measuring sensor 47. In addition, as illustrated in FIG. 17C, the height measurement position set for the checking of the locked state in advance in connector 13, for example, the heights of the (A) position and (C) position illustrated in FIG. 13, are measured by distance measuring sensor 47, and in a case where the difference in height at the two positions is equal to or less than the predetermined value, it is determined that cover member 14 is in a close state and the operation of the lock mechanism is excellent in connector 13, and the cable mounting operation is finished.

Meanwhile, in a case where the difference in height in the height measurement result of the (A) position and the (C) position exceeds the predetermined value in (ST8), it is determined that an insufficient lock-closing state where cover member 14 is not completely closed is achieved and a state where the lock mechanism sufficiently functions is not achieved. In addition, in the case, notifier 55 notifies the operator of the contents by displaying the contents on operation panel 10 (ST9). Accordingly, it is checked that a defect is generated in a locked state after the cable mounting in connector 13, and it is possible to prevent a defect that electronic equipment 4 is sent to the next process while the locked state is not completely achieved.

In the electronic equipment assembly method performed by the above-described electronic equipment assembly apparatus 1, first, the locked-state checker provided in electronic equipment assembly apparatus 1 checks the state of the lock mechanism provided in connector 13 on which cable 17 is not installed. In addition, when the state of the lock mechanism is a state where cable 17 is mountable, the cable mounting mechanism which moves cable holding tool 20 by robot portion 5 installs cable 17 onto connector 13.

In addition to this, the lock operation mechanism configured to move connector lock tool 30 by robot portion 5 is operated, and cable 17 is locked to connector 13 by operating the lock mechanism provided in connector 13. In addition, after this, the locked-state checker checks the state of the lock mechanism of connector 13 on which cable 17 is installed. In other words, in the example illustrated here, cable holding tool 20 and connector lock tool 30 are configured to move by single robot portion 5.

As described above, the electronic equipment assembly apparatus according to the exemplary embodiment installs mounted portion 15b of cable 17 onto connector 13 of electronic equipment 4, cable 17 including belt-shaped cable main body portion 15 in which mounted portion 15b is formed in one end portion 15a, and reinforcing plate 16 bonded to one end portion 15a side on one surface 15c of cable main body portion 15. In addition, electronic equipment assembly apparatus 1 includes: cable holding tool 20 which holds reinforcing plate 16; work stage 3 which holds electronic equipment 4; robot portion 5 which relatively moves cable holding tool 20 to electronic equipment 4 held by work stage 3; and controller 51 which operates robot portion 5 and cable holding tool 20 to mount mounted portion 15b of cable main body portion 15 onto connector 13.

In addition, as described above, the electronic equipment assembly method according to the exemplary embodiment includes mounting mounted portion 15b of cable 17 onto connector 13 of electronic equipment 4, cable 17 including belt-shaped cable main body portion 15 in which mounted portion 15b is formed in one end portion 15a, and reinforcing plate 16 bonded to one end portion 15a side on one surface 15c of cable main body portion 15. In addition, the electronic equipment assembly method includes: holding the reinforcing plate 16 by cable holding tool 20; and mounting mounted portion 15b of cable main body portion 15 onto connector 13 of electronic equipment 4 by moving cable holding tool 20. Accordingly, it is possible to automate the connection work for installing cable 17 with reinforcing plate 16 onto connector 13, and to improve work efficiency.

The electronic equipment assembly apparatus and the electronic equipment assembly method of the disclosure have an effect of automating the connection work for installing the cable with the reinforcing plate onto the connector, and improving the work efficiency, and are advantageous in an electronic equipment assembly field for installing the cable onto the connector of the electronic equipment.

What is claimed is:

1. An electronic equipment assembly apparatus which installs a cable onto a connector of electronic equipment, the cable including a cable main body portion having a mounted portion formed in an end portion of the cable main body portion, and a reinforcing plate bonded to the end portion on a surface of the cable main body portion, the apparatus comprising:
   a cable holding tool which holds the reinforcing plate;
   a robot portion which moves the cable holding tool relative to the electronic equipment; and
   a controller that is configured to operate the robot portion and the cable holding tool to mount the mounted portion of the cable main body portion onto the connector.

2. The electronic equipment assembly apparatus of claim 1,
   wherein the cable holding tool is a chuck mechanism which nips the reinforcing plate from an upward-and-downward direction.

3. The electronic equipment assembly apparatus of claim 2,
   wherein the reinforcing plate has a bonding portion bonded to the end portion of the cable main body portion,
   wherein a port opening portion is formed between the cable main body portion and the reinforcing plate on a side of the reinforcing plate opposite to the bonding portion, and
   wherein the chuck mechanism includes a blade inserted into the port opening portion between the cable main body portion and the reinforcing plate such that the reinforcing plate is positioned on an upper surface of the blade, and a chuck block which abuts against the reinforcing plate and presses the reinforcing plate downward.

4. The electronic equipment assembly apparatus of claim 3,
   wherein a slip stopper is formed on a lower surface of the chuck block which abuts against the reinforcing plate.

5. The electronic equipment assembly apparatus of claim 3,
   wherein the lower surface of the chuck block protrudes to the upper surface of at least the bonding portion when interposing the reinforcing plate.

6. The electronic equipment assembly apparatus of claim 1,
   wherein the robot portion is a parallel link robot.

7. The electronic equipment assembly apparatus of claim 6,
   wherein the parallel link robot is a six-degree-of-freedom type.

8. An electronic equipment assembly method for installing the cable onto the connector of electronic equipment using the electronic equipment assembly apparatus of claim 1, the method comprising:
   holding the reinforcing plate by the cable holding tool; and
   mounting the mounted portion of the cable main body portion onto the connector of the electronic equipment by moving the cable holding tool.

9. The electronic equipment assembly method of claim 8,
wherein the reinforcing plate has a bonding portion bonded to the end portion of the cable main body portion,
wherein a port opening portion is formed between the cable main body portion and the reinforcing plate on a side of the reinforcing plate opposite to the bonding portion,
wherein the cable holding tool includes a blade inserted into the port opening portion between the cable main body portion and the reinforcing plate such that the reinforcing plate is positioned on an upper surface of the blade, and a chuck block which presses the reinforcing plate downward, and
wherein the reinforcing plate is held by inserting the blade between the cable main body portion and the reinforcing plate, and then, by arranging the chuck block to be close to the blade and to nip the reinforcing plate.

10. The electronic equipment assembly apparatus of claim 1, further comprising a work stage that holds the electronic equipment.

11. The electronic equipment assembly apparatus of claim 1, wherein the cable main body portion is belt shaped.

12. The electronic equipment assembly apparatus of claim 1, wherein the robot portion includes a base, and the controller that is configured to move the base of the robot portion to move the cable holding tool relative to the electronic equipment.

* * * * *